United States Patent
Kim et al.

(10) Patent No.: US 12,354,195 B2
(45) Date of Patent: Jul. 8, 2025

(54) SYSTEM AND METHOD FOR FACE SWAPPING WITH SINGLE/MULTIPLE SOURCE IMAGES USING ATTENTION MECHANISM

(71) Applicant: KOREA ADVANCED INSTITUTE OF SCIENCE AND TECHNOLOGY, Daejeon (KR)

(72) Inventors: Dae-Shik Kim, Daejeon (KR); Jae-Hyeok Lee, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 246 days.

(21) Appl. No.: 18/109,519

(22) Filed: Feb. 14, 2023

(65) Prior Publication Data
US 2023/0260176 A1 Aug. 17, 2023

(30) Foreign Application Priority Data

Feb. 15, 2022 (KR) .................. 10-2022-0019582
Jan. 3, 2023 (KR) .................. 10-2023-0000493

(51) Int. Cl.
G06T 11/60 (2006.01)
G06V 40/16 (2022.01)

(52) U.S. Cl.
CPC ............ *G06T 11/60* (2013.01); *G06V 40/171* (2022.01)

(58) Field of Classification Search
CPC .... G06T 11/60; G06V 40/171; G06V 10/462; G06V 10/82
See application file for complete search history.

(56) References Cited

U.S. PATENT DOCUMENTS

| 11,425,448 | B1 * | 8/2022 | Khot | H04N 21/631 |
| 11,631,208 | B1 * | 4/2023 | Khirman | G06N 3/088 |
| | | | | 382/100 |

FOREIGN PATENT DOCUMENTS

| CN | 113628134 A | * 11/2021 | ............... G06T 5/50 |
| KR | 10-2017-0109851 | 10/2017 | |
| KR | 10-2188991 | 12/2020 | |

OTHER PUBLICATIONS

E. Richardson et al., "Encoding in Style: a StyleGAN Encoder for Image-to-Image Translation," in 2021 IEEE/CVF Conference on Computer Vision and Pattern Recognition (CVPR), Nashville, TN, USA, 2021, pp. 2287-2296, doi: 10.1109/CVPR46437.2021.00232 (Year: 2021).*

Zhang, Han et al. "Self-Attention Generative Adversarial Networks." arXiv.org (2019): n. pag. Print. (Year: 2019).*

J. Naruniec et al., "High-Resolution Neural Face Swapping for Visual Effects", Computer Graphics Forum, vol. 39, pp. 173-184, Wiley Online Library, 2020.

(Continued)

*Primary Examiner* — Kee M Tung
*Assistant Examiner* — Xiaoming Wei (57) ABSTRACT

Provided is a system for swapping face with high-definition comprising a feature point extraction unit for extracting at least one feature points from a source image; an identity conversion unit generating an output for an attention algorithm from the at least one feature points from the feature point extraction unit; and an image generation unit for generating a swapping face image according to the output from the identity conversion unit.

11 Claims, 6 Drawing Sheets

(56) References Cited

OTHER PUBLICATIONS

Yuhan Wang et al., HifiFace: 3D Shape and Semantic Prior Guided High Fidelity Face Swapping, 13$^{th}$ International Joint Conference on Artificial Intelligence, IJCAI-21, pp. 1136-1142, International Joint Conferences on Artificial Intelligence Organization, Jun. 18, 2021.

Yuhao Zhu et al., "One Shot Face Swapping on Megapixels", IEEE/CVF Conference on Computer Vision and Pattern Recognition, pp. 4834-4844, 2021.

Renwang Chen et al., "SimSwap: An Efficient FrameworkFidelity Face Swapping", ACMMM, 2020.

* cited by examiner

FIG. 1

< Prior Art >

<Face swapping result with limited source images>

FIG. 2

< Prior Art >

FIG. 3

< Prior Art >

Source (Identity)     Target (Background)     Result

FIG. 7

Source (Identity)     Target (Background)     Result

SYSTEM AND METHOD FOR FACE SWAPPING WITH SINGLE/MULTIPLE SOURCE IMAGES USING ATTENTION MECHANISM

CROSS-REFERENCE TO RELATED APPLICATION

This application claims priority of Korean Patent Application No. 10-2022-0019582, filed on Feb. 15, 2022, and priority of Korean Patent Application No. 10-2023-0000493, filed on Jan. 3, 2023, in the KIPO (Korean Intellectual Property Office), the disclosure of which is incorporated herein entirely by reference.

BACKGROUND OF THE INVENTION

Field of the Invention

The present invention relates to system and method for face swapping with single/multiple source images using attention mechanism.

Description of the Related Art

Face swapping is a task that transfers the identity of the source image to the target image without affecting the attributes (e.g., pose, expression, etc.) of the target. Recently, it has received considerable attention due to various applications such as entertainment, film industry, and privacy protection. Despite such high interest, research on face swapping of high-resolution images, which is widely used recently, is still in its infancy. However, it is important to note that advances in face swapping would lead to enhanced face forgery detection in modern data-driven technology development.

However, conventional face swapping methods have a problem that a high-quality (high-resolution, expressionless, frontal gaze) source images are required for face swapping. Otherwise, when a low-quality images are used (for example, pictures showing unusual expression or posture of character), a unwanted face swapping result with low resolution is obtained.

Figure 1:
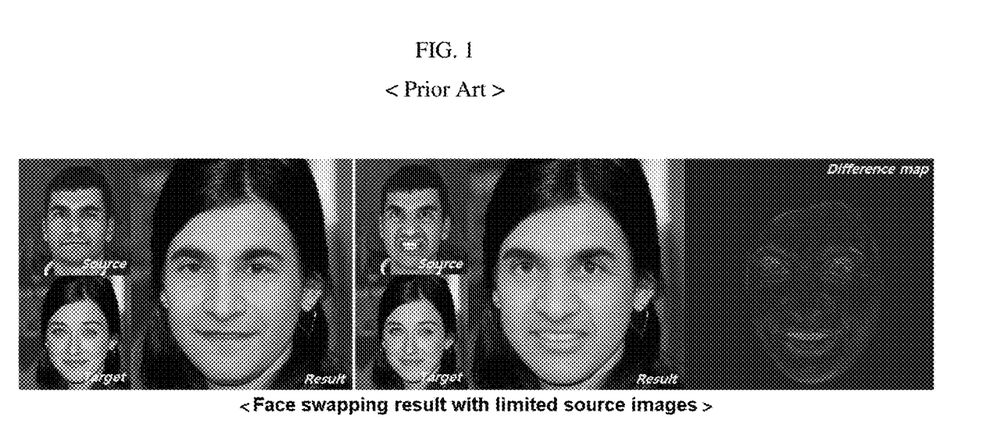
FIG. 1 is a face swapping result according to the prior art as described above.

FIG. 1 is a face swapping result according to the prior art as described above.

Referring to FIG. 1, when a low-quality source image is used (for example, a unique facial expression or posture is shown), a low-quality face swapping result is obtained as shown in the lower right FIG. 1.

In particular, given that the range of expressions and postures that can be taken by objects is very wide in real life, these problems occur frequently, accordingly. Therefore, a fundamental solution to solve the problem as mentioned above is needed.

Several papers dealing with face swapping at high resolution have been recently introduced.

First, Disney Research has recently proposed face swapping technology in high-resolution, but it requires the training of decoders for a different identity. (Please refer to J. Naruniec et al., "High-Resolution Neural Face Swapping for Visual Effects", Computer Graphics Forum, Volume 39, pages 173-184, Wiley Online Library, 2020.)

Second, HifiFace focused on the shape of the face via a 3D shape-aware identity extractor and a novel fusion module and showed impressive results. However, the maximum resolution of HifiFace was limited to 5122, and a separately trained portrait enhancement network was required to obtain high fidelity results. (Please refer to Yuhan Wang et al., "HifiFace: 3D Shape and Semantic Prior Guided High Fidelity Face Swapping, 13$^{th}$ International Joint Conference on Artificial Intelligence, IJCAI-21, pages 1136-1142, International Joint Conferences on Artificial Intelligence Organization, Jun. 18, 2021.)

Third, MegaFS utilized strong prior knowledge of the faces in pre-trained StyleGAN2. Specifically, the source and target were mapped in W++ space using a hierarchical encoder, and then face swapping was performed through the face transfer module. Although Zhu et al. proposed the first subject-agnostic 10242-scale face swapping in their work, the visual quality of MegaFS's results was not satisfactory enough. (Please refer to Yuhao Zhu et al., "One Shot Face Swapping on Megapixels", IEEE/CVF Conference on Computer Vision and Pattern Recognition, pages 4834-4844, 2021.)

Fourth, SimSwap extracts and uses the id vector of the source using a pre-learned identity extractor, and fuses the id vector extracted between the deep network-based encoder-decoder with the target feature to generate a face to resemble the identity of the source. (Please refer to Renwang Chen et al., "SimSwap: An Efficient Framework For High Fidelity Face Swapping", ACMMM, 2020.)

Figure 2:
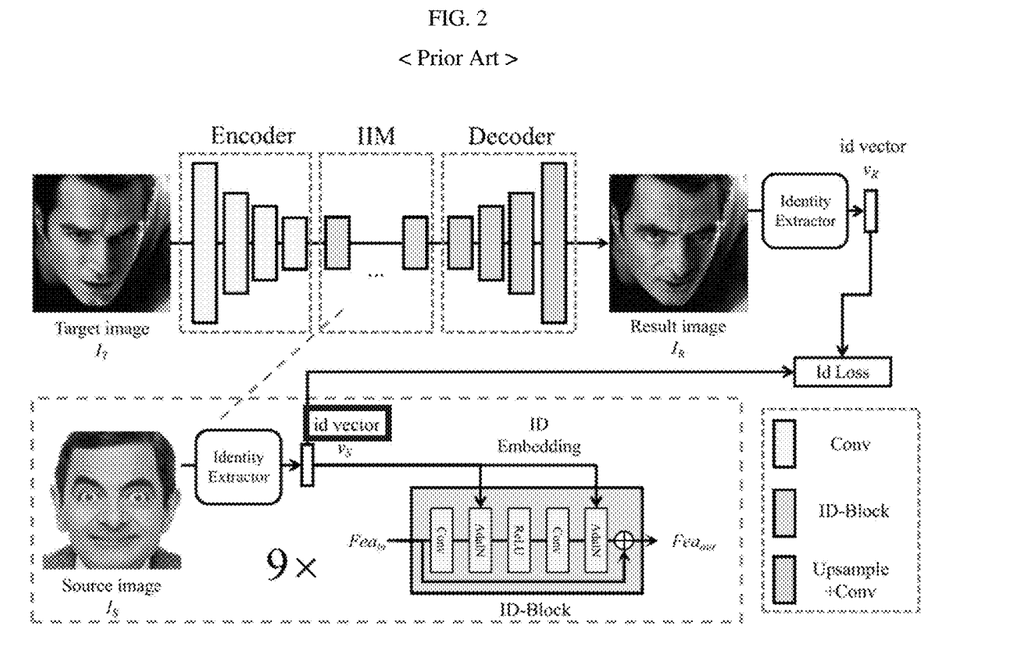
FIG. 2 shows framework and results of SimSwap algorithm.

FIG. 2 shows framework and results of SimSwap algorithm

Referring to FIG. 2, it can be found the resolution of SimSwap's result is limited up to 256×256. In addition, since the id vector is extracted using a pre-learned Identity Extractor regardless of the target image, the quality of the result is degraded because the inherent information in the source cannot be used adaptively.

Figure 3:
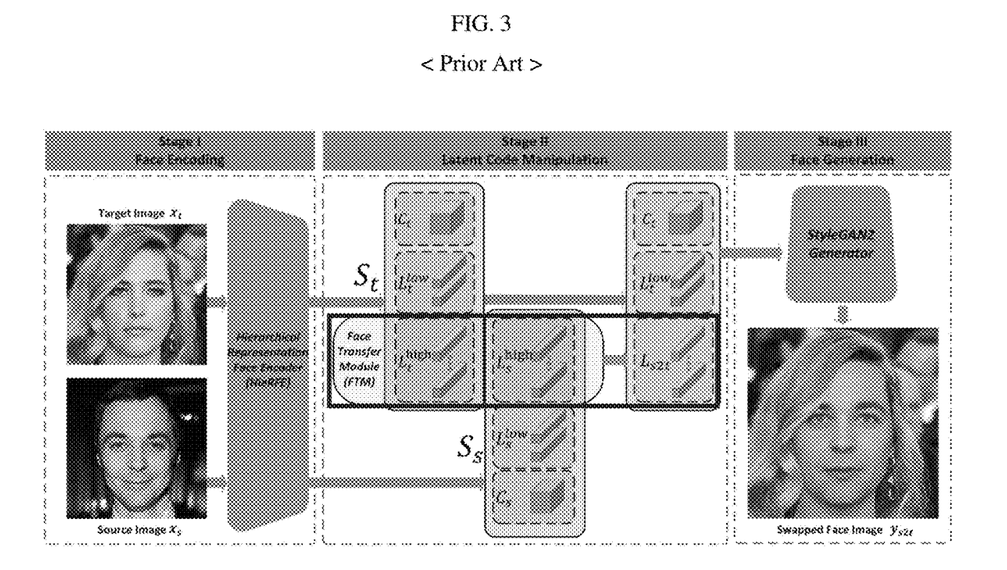
FIG. 3 shows framework and results of MegaFS algorithm.

FIG. 3 shows framework and results of MegaFS algorithm.

Referring to FIG. 3, it is not the entire images but only blue box where actual face swapping performs. Accordingly, deterioration in quality happens because of not using the whole area of images.

Korean Patent Registration No. 10-2188991 discloses a face swapping technology. However, this prior art has a problem in that it cannot be applied to arbitrary photos because it uses a subject-specific method. In addition, there is a problem in which a solution to the problem of a high-resolution, high-definition face replacement method and a solution to the use of a low-quality source face image are not disclosed at all.

Korean Patent Application Publication No. 10-2017-0109851 also relates to a face swapping technology. However, this prior art also has a problem in that it cannot be applied to arbitrary photos because it uses a subject-specific method. In addition, there is a problem in which a solution to the problem of a high-resolution, high-definition face replacement method and a solution to the use of a low-quality source face image are not disclosed at all. In addition, since it does not use a deep learning or machine learning-based method and only uses noise information extraction, the quality of the result is expected to be poor as well.

Therefore, a new way capable of generating high-quality images from low-quality source images in a subject-agnostic manner is required.

SUMMARY OF THE INVENTION

The present disclosure is directed to providing to system and method for face swapping with single/multiple source images using attention mechanism, capable of generating high-quality images from low-quality source images in a subject-agnostic manner.

The present disclosure provides A system for swapping face with high-definition comprising a feature point extraction unit for extracting at least one feature points from a source image; an identity conversion unit generating an output for an attention algorithm from the at least one feature points from the feature point extraction unit; and an image generation unit for generating a swapping face image according to the output from the identity conversion unit.

In an exemplary embodiment of the present disclosure, the identity conversion unit generates the output for both a soft attention and a hard attention algorithm at the same time.

In an exemplary embodiment of the present disclosure, the soft attention algorithm generates an attention value according to the equation below:

$$A_{soft}=S\cdot\text{Norm}(\overline{F}_t)+M,$$

where $A_{soft} \in R^{C \times HW}$ is the output of soft attention, $V=h(F_s)$, $M=V \otimes A^T$, $S=\sqrt{V^2 \otimes A^T - M^2}$, $h(\cdot)$ is a 1×1 convolution layer, $M \in R^{C \times HW}$ where each point in M can be interpreted as the sum of all points in V weighted by A.

In an exemplary embodiment of the present disclosure, the soft attention algorithm generates attention an attention value according to the equation below:

$$h_i = \arg\max_j A_{(i,j)},$$
$$A_{hard(i,j)} = V_{(i,h_i)},$$

where $A_{hard}$ is the output of the hard attention algorithm, the value of $h_i$ is an index, which represents the most relevant position in the source image with respect to the i-th position in the target image, A(i,j) indicates the attention score of the j-th key for the i-th query, and $A_{hard}$ (i, j) is the element at the (i, j) position of $A_{hard}$.

In an exemplary embodiment of the present disclosure, the identity conversion unit generates an attention map $A \in R^{HW \times HW}$ for the soft and hard attention algorithm according to the equation below:

$$A=\text{Softmax}(Q_u^T \otimes K_u),$$

where $Q_u \in R^{C \times HW}$ and $K_u \in R^{C \times HW}$ are unfolded representation of $Q \in R^{C \times H \times W}$ and $K \in R^{C \times H \times W}$, and $\otimes$ is matrix multiplication.

In an exemplary embodiment of the present disclosure, the source image comprises at least two images.

In an exemplary embodiment of the present disclosure, the system further comprises a learning unit that performs learning using an Ideality preserving loss, Identity loss, Learned Perceptual Image Patch Similarity (LPIPS) loss, Self-reconstruction loss, and Regularization loss.

In an exemplary embodiment of the present disclosure, the loss function ($L_{total}$) can be defined as below:

$$L_{total}=\lambda_1 L_{ip}+\lambda_2 L_{id}+\lambda_3 L_{LPIPS}+\lambda_4 L_{self}+\lambda_5 L_{reg},$$

where $L_{ip}$ is Ideality preserving loss, $L_{id}$ is Identity loss, $L_{LPIPS}$ is LPIPS (Learned Perceptual Image Patch Similarity) loss, $L_{self}$ is self-reconstruction loss, $L_{reg}$ is Regularization loss.

The present disclosure also provides a method for swapping face with high-definition comprises mapping feature points of a source image to a feature space; generating an output for an attention algorithm from the mapped feature points; and performing face swapping from the output, wherein the output comprises the output for both a soft and a hard attention algorithm.

In an exemplary embodiment of the present disclosure, the output for the soft attention algorithm is generated as below:

$$A_{soft}=S\cdot\text{Norm}(\overline{F}_t)+M,$$

where $A_{soft} \in R^{C \times HW}$ is the output of soft attention, $V=h(F_s)$, $M=V \otimes A^T$, $S=\sqrt{V^2 \otimes A^T - M^2}$, $h(\cdot)$ is a 1×1 convolution layer, $M \in R^{C \times HW}$ where each point in M can be interpreted as the sum of all points in V weighted by A.

In an exemplary embodiment of the present disclosure, the output for the hard attention algorithm is generated as below:

$$h_i = \arg\max_j A_{(i,j)},$$
$$A_{hard(i,j)} = V_{(i,h_i)},$$

where $A_{hard}$ is the output of the hard attention algorithm, the value of $h_i$ is an index, which represents the most relevant position in the source image with respect to the i-th position in the target image, A(i,j) indicates the attention score of the j-th key for the i-th query, and $A_{hard}$ (i, j) is the element at the (i, j) position of $A_{hard}$.

In an exemplary embodiment of the present disclosure, the source image comprises at least two images.

In an exemplary embodiment of the present disclosure, the method further comprises performing learning using an identity loss, Learned Perceptual Image Patch Similarity (LPIPS) loss, self-reconstruction loss, and regularization loss.

In an exemplary embodiment of the present disclosure, the loss function ($L_{total}$) can be defined as below:

$$L_{total}=\lambda_1 L_{ip}+\lambda_2 L_{id}+\lambda_3 L_{LPIPS}+\lambda_4 L_{self}+\lambda_5 L_{reg},$$

where $L_{ip}$ is Ideality preserving loss, $L_{id}$ is Identity loss, $L_{LPIPS}$ is LPIPS (Learned Perceptual Image Patch Similarity) loss, $L_{self}$ is self-reconstruction loss, $L_{reg}$ is Regularization loss.

According to the present invention, a high-quality image can be generated from a low-quality image in a subject-agnostic manner, and the quality of a result can be improved by using two or more low-quality images complementary to each other.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

The present invention provides a system and method for generating high-quality images from low-quality source image(s) by utilizing two or more low-quality images complementary to each other.

Figure 4:
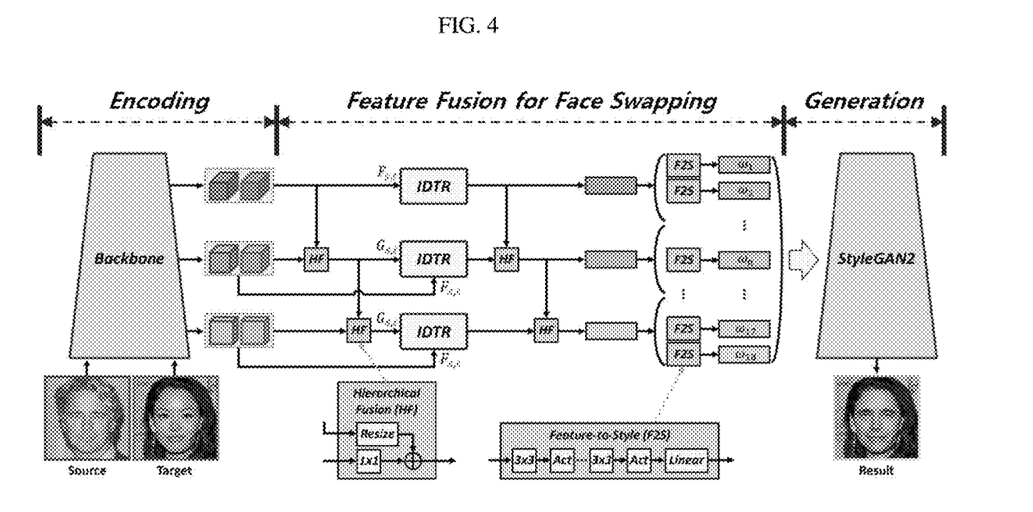
FIG. 4 shows the overall architecture and notations of the proposed face swapping framework.

FIG. 4 shows the overall architecture and notations of the proposed face swapping framework. First, we extract the features of the source and target images using the pretrained backbone of pSp (please refer to Elad Richardson, Yuval Alaluf, Or Patashnik, Yotam Nitzan, Yaniv Azar, Stav Shapiro, and Daniel Cohen-Or, "Encoding in style: a stylegan encoder for image-to-image translation", In IEEE/CVF Conference on Computer Vision and Pattern Recognition (CVPR), June 2021) to use W+$\in$R 18×512 space of StyleGAN2 (please refer to Tero Karras, Samuli Laine, Miika Aittala, Janne Hellsten, Jaakko Lehtinen, and Timo Aila, "Analyzing and improving the image quality of stylegan", In Proceedings of the IEEE/CVF Conference on Computer Vision and Pattern Recognition, pages 8110-8119, 2020.)

Unlike conventional method where extracting identities are performed at this process, the present invention performs mapping maximum information including identities of images to a feature space in order to prevent information loss occurring in this process.

According to the present invention, features are extracted at three levels—coarse, medium, and fine-according to the tradition of several GAN inversion studies (Please refer to Yuval Alaluf, Or Patashnik, and Daniel Cohen-Or, "Only a matter of style: Age transformation using a style-based regression model", arXiv preprint arXiv:2102.02754, 2021.)

As shown in FIG. 4, extracted features $F_{s,t}$ are fed into the proposed Identity Transformer (IDTR) along with $G_{s,t}$ which is fused to consider hierarchical information. IDTR of the coarsest level receives only $F_{s,t}$ as input, and also replaces the positions of $G_{s,t}$. After that, IDTR performs face swapping at the feature level, and the result is mapped to the W+ space of StyleGAN2 through hierarchical fusion and feature-to style module. In this way, a total of 18 style vectors are obtained, and finally, a face swapped image is generated by entering the style vectors into StyleGAN2.

The system and method for swapping face based on the attention algorithm according to the present invention includes mapping feature points of a source image to a feature space first, and then generating an output for an attention algorithm from the mapped feature points. After that, performing face swapping from the output, wherein the output comprises the output for both a soft and a hard attention algorithm is implemented.

In the process, the IDTR generates an attention map and outputs soft/hard attention values. In addition, the attention map may be differently expanded according to the number of source images, and the present invention will be described in more detail through each element below.

1. IDTR (Identity Transformer)

Figure 5:
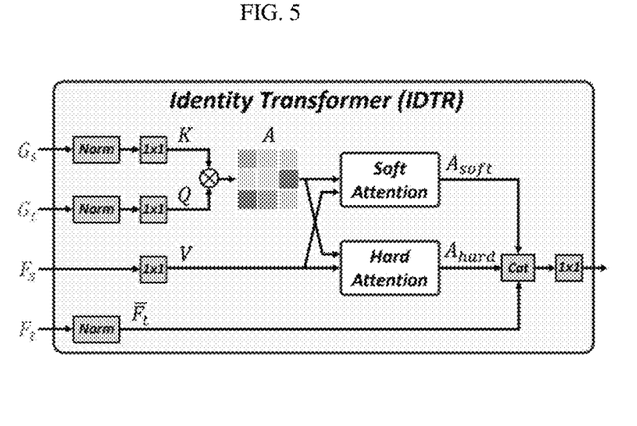
FIG. 5 is a detailed architecture of our IDTR.

FIG. 5 is a detailed architecture of our IDTR.

As shown in FIG. 5, IDTR performs face swapping through the following two processes: 1) generation of attention map (A) using the relevance between representations from the source and the target; and 2) soft/hard attention using the generated attention map A.

1.1 Attention Map Generation

The attention map aims to embed the relevance between the source and the target by measuring the similarity between the two. To measure the similarity, we formulate key (K) and query (Q) as follows:

$$K = f(\text{Norm}(G_s))$$

$$Q = g(\text{Norm}(G_t)),$$

where f(•) and g(•) are 1×1 convolution layers, Norm denotes Instance Normalization. In the computation of K and Q, Gs and Gt are utilized to reflect the hierarchical information at a coarser level.

Attention map, $A \in R^{HW \times HW}$, is formulated as follows:

$$A = \text{Softmax}(Q_u^T \otimes K_u),$$

where $Q_u \in R^{C \times HW}$ and $K_u \in R^{C \times HW}$ are unfolded representation of $Q \in R^{C \times H \times W}$ and $K \in R^{C \times H \times W}$ and $\otimes$ is matrix multiplication.

Each element A(i, j) (i, j)∈[1, HW]) of A means the relevance between the i-th feature of the target and the j-th feature of the source. That is, the attention map contains distributed relevance information in the entire area of the source image for each specific location of the target image. In soft/hard attention, face swapping is performed at the feature level using these characteristics.

1.2 Soft Attention

The proposed soft attention was inspired by the use of Adaptive Instance Normalization (AdaIN) (Please refer to Xun Huang and Serge Belongie, "Arbitrary style transfer in real-time with adaptive instance normalization", In Proceedings of the IEEE International Conference on Computer Vision, pages 1501-1510, 2017) in the existing face swapping methods with a face recognition network in their framework. AdaIN works as follows:

$$AdaIN(x, y) = \sigma(y)\left(\frac{x - \mu(x)}{\sigma(x)}\right) + \mu(y),$$

in AdaIN, in order to transfer the style of y to x, the statistics of the representation of x are changed by using the statistics of y.

We use the attention map and the source representation to change the statistics of the target representation to be the same as that of the source. As a result, just as the style of y is transferred to x in AdaIN, the identity of the source is transferred to the target in our soft attention.

As shown in FIG. 5, soft attention takes as input the attention map (A) and a value (V) that is obtained from the source image:

$$V = h(F_s),$$

where h(•) is a 1×1 convolution layer.

After that, the attention-weighted mean (M) of the V, serving as μ(y) of AdaIN, is formulated as follows:

$$M = V \otimes A^T,$$

where $M \in R^{C \times HW}$.

Each point in M can be interpreted as the sum of all points in V weighted by A. Since the variance of a random variable is equal to the expectation of its square minus the square of its expectation, we can get attention-weighted standard deviation (S) of V as follows:

$$S = \sqrt{V^2 \otimes A^T - M^2},$$

where V2 and M2 are the element-wise squares of V and M.

Using the obtained M and $S \in R^{C \times HW}$, the statistic of the target representation changes as follows:

$$A_{soft} = S \cdot \text{Norm}(\overline{F}_t) + M,$$

where $A_{soft} \in R^{C \times HW}$ is the output of soft attention.

In summary, we define face swapping as a statistical change of representation in a similar way to AdaIN. To realize the statistical change in the target representation, we formulate the mean and standard deviation based on the attention map.

1.3 Hard Attention

In the soft attention, M is obtained by the weighted summation of V by A, for each query point. However, these operations may alter the distribution of source features, causing blur effects or inaccurate identity transfer. Therefore, in our hard attention, we only transfer the most relevant features of V for each query point. Hard attention Ahard is denoted as follows:

$$h_i = \arg\max_j A_{(i,j)},$$
$$A_{hard\,(i,j)} = V_{(i,h_i)}$$

where the value of $h_i$ is an index, which represents the most relevant position in the source image with respect to the i-th position in the target image.

$A_{(i,j)}$ indicates the attention score of the j-th key for the i-th query, and $A_{hard\,(i,j)}$ is the element at the (i, j) position of $A_{hard}$. $A_{soft}$ and $A_{hard}$ generated through the proposed soft/hard attention are concatenated with the normalized target feature $\overline{F}_t$ and move on to the next step.

2. Multi-Source Face Swapping (MSFS)

In the above, the present invention introduces face swapping in general single-source and single-target setting. The present invention also can be applied to multi-source face swapping that performs face swapping using multiple source images from the same person simultaneously.

Since IDTR performs face swapping based on the attention mechanism, the concept can be naturally extended to multi-source face swapping. Specifically, when there are N source images, we can assume that K, Q, and V all have the same size as $R^{N \times C \times H \times W}$ (as Q is computed from one target, it is repeated N times along batch dimension). After that, K and Q are unfolded so that $K_u$ and $Q_u$ have the size of $R^{N \times C \times HW}$. We define $A_{multi} \in R^{HW \times NHW}$ as follows:

$$A_{multi} = \text{Softmax}(Q_u^T \odot K_u),$$

where ⊙ is batch matrix multiplication.

Each element $A_{multi\,(i,j)}$ (i∈[1, HW] and j∈[1, NHW]) of $A_{multi}$ indicates the relevance between the i-th feature of the target and the j-th feature of the sources. Therefore, it is possible to take into account the relevance between all possible pairs between the representation of multiple sources and the representation of a target. Then, face swapping is performed through soft/hard attention in the same way as single source situation.

3. Learning Strategy

The system according to present invention further comprises a learning unit where a learning is performed using ideality preserving loss, identity loss, Learned Perceptual Image Patch Similarity (LPIPS) loss, self-reconstruction loss, and regularization loss.

3.1 Ideality Preserving Loss

Ideality preserving loss guides IDTR to extract features robust to the source's attribute. Specifically, IDTR is trained to extract the same latent vector w when the input is an ideal source and when the inputs are $M_{ip}$ non-ideal sources. Figuratively, the human can draw an ideal face when several non-ideal faces with partially ideal parts are given, i.e., information inside non-ideal faces can be selectively collected. Likewise, through this loss function, IDTR learns to selectively collect ideal identity information distributed in multiple non-ideal source images:

$$L_{ip} = \sum_{n=1}^{18} |w_n^I - w_n^{NI}|_1,$$

where $\{w_n^I\}$ and $\{w_n^{NI}\}$ are latent vectors extracted from a single ideal source and multiple non-ideal sources respectively.

3.2 Identity Loss

Identity loss is used to constrain the identity between source image x and swapped result ŷ. We utilize the cosine similarity to calculate the distance, and the pre-trained ArcFace R(•) to extract identity:

$$L_{id} = 1 - \cos(R(x), R(\hat{y})).$$

3.3 LPIPS (Learned Perceptual Image Patch Similarity) Loss

LPIPS loss is adopted to capture fine details and further improve the realism. We utilize perceptual feature extractor F(•):

$$L_{LPIPS} = \|F(y) - F(\hat{y})\|_2.$$

3.4 Self-Reconstruction Loss

Self-reconstruction loss is used to constrain pixel-wise difference between target y and swapped result ŷ, when the source x is randomly horizontal flipped version of the target y. We allocate certain portion of the batch for this loss:

$$L_{self} = |y - \hat{y}|_1, \text{ where } x = H \text{ Flip}(y, \text{prob}=0.5).$$

3.5 Regularization Loss

Regularization loss is applied to encourage the feature-to-style module to output latent style vectors closer to the average latent vector w of pre-trained StyleGAN2:

$$L_{reg} = \sum_{n=1}^{18} |w_n - \bar{w}_n|_1, \text{ where } \{w_n\}, \{\bar{w}_n\} \in \mathcal{W}^+.$$

In summary, the total loss function is defined as:

$$L_{total} = \lambda_1 L_{ip} + \lambda_2 L_{id} + \lambda_3 L_{LPIPS} + \lambda_4 L_{self} + \lambda_5 L_{reg},$$

where $\lambda_1=0.0003$, $\lambda_2=1$, $\lambda_3=3$, $\lambda_4=1$, and $\lambda_5=0.01$.

A table below shows an effect of ideality preserving loss, Lip, by showing changes in PSNR/SSIM according to Mip and λ1.

TABLE

EFFECT OF IDEALITY PRESERVING LOSS. THIS TABLE SHOWS THE PERFORMANCE CHANGE OF THE MODEL ACCORDING TO THE SELECTION OF EACH $\lambda_1$ AND $m_{ip}$. THE TWO NUMBERS ON EACH LINE ARE THE PSNR/SSIM SCORES. THE THREE LINES INSIDE EACH CELL ARE THE RESULTS IN THE SINGLE-SOURCE, MULTI-SOURCE (W/O IDEAL), AND MULTI-SOURCE (W/IDEAL) SETTINGS OF TAB. 11, RESPECTIVELY. FOR A MULTI-SOURCE SETTING, TWO SOURCE IMAGES ARER USED IN EACH INFERENCE. NOTE THAT $M_{ip}$ AND THE NUMBER OF SOURCE IMAGES FOR MULTI-SOURCE FACE SWAPPING AT INFERENCE TIME CAN BE DIFFERENT. FOR EACH SETTING, BOLD, UNDERLINE, AND ITALIC INDICATE THE BEST, SECOND-BEST, AND THE WORST PERFORMANCE.

| | $M_{ip}$ | | | |
|---|---|---|---|---|
| $\lambda_1$ | 1 | 3 | 5 | 7 |
| 0 | *29.6810/0.9294* | — | — | — |
| | *30.2233/0.9339* | | | |
| | *34.7270/0.9595* | | | |
| 0.0001 | — | 30.1988/0.9324 | 30.2445/0.9327 | 30.2091/0.9330 |
| | | 30.6898/0.9363 | 30.8284/0.9373 | 30 7491/0.9373 |
| | | 34.9808/0.9597 | 35.2306/0.9609 | 35.3615/0.9615 |
| 0.0003 | — | 30.4491/0.9347 | 30.4639/0.9331 | 30.2628/0.9324 |
| | | 30.9523/0.9387 | 31.0949/0.9380 | 30.8171/0.9368 |
| | | 35.0473/0.9602 | 35.4320/0.9610 | 35.3070/0.9608 |
| 0.001 | — | 30.1910/0.9319 | 30.4765/0.9343 | 30.1456/0.9312 |
| | | 30.7132/0.9361 | 31.0340/0.9387 | 30 6993/0.9357 |
| | | 34.8181/0.9581 | 35.3004/0.9612 | 34.8308/0.9587 |

As shown in the table, the performance of models trained with Lip are superior in all three settings (i.e., single-source, multi-source without ideal, and multi-source with ideal) compared to when it is not used (λ1=0). In other words, when a non-ideal source(s) is given to a model trained using Lip, more ideal information is selectively extracted from the non-ideal source(s).

The performance improvement is bigger when λ1 is large than when λ1 is small, and many superior performance are shown when Mip is 5. Therefore, we use 0.0003 for λ1 and 5 for Mip in the remaining parts.

4. Result

Figure 6:
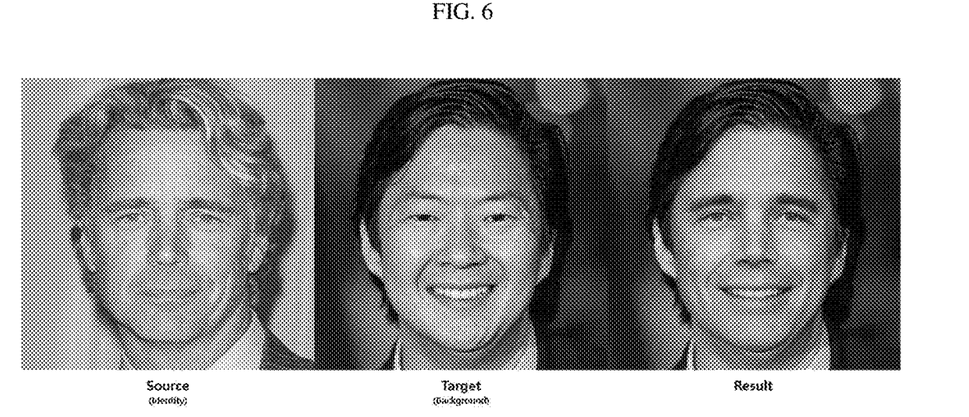
FIGS. 6 and 7 shows the result when the present invention is implemented.
Figure 7:
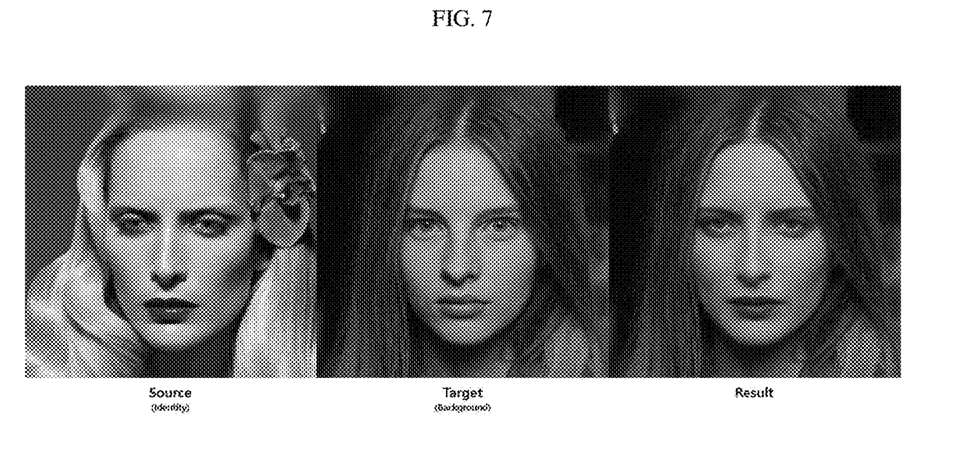

FIGS. 6 and 7 shows the result when the present invention is implemented.

Referring to FIGS. 6 and 7, Realistic results with high resolution (1024×1024) and high definition can be obtained.

Figure 8:
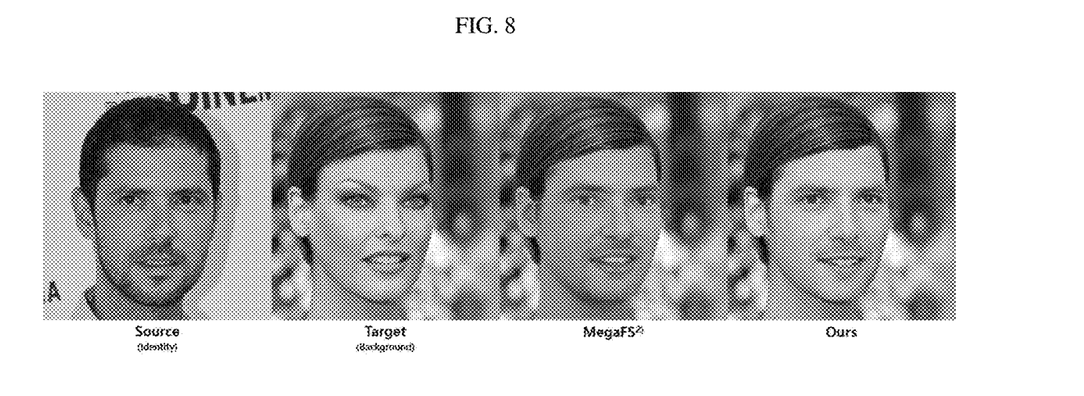
FIGS. 8 and 9 shows comparison result with prior art.
Figure 9:
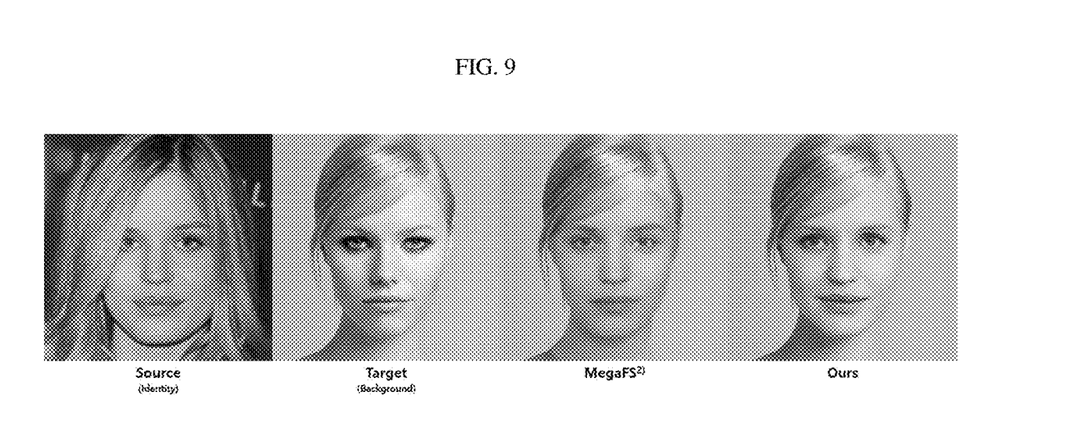

FIGS. 8 and 9 shows comparison result with prior art.

Referring to FIGS. 8 and 9, compared to the prior art 2 where a subject-agnostic high-resolution (1024×1024) face swapping technology has been disclosed, it can be seen that the present invention obtains much more natural results through use of information inherent in the source and target in more effective way. In particular, it is noteworthy that the present invention has the advantage of enabling very effective and realistic 'Subject-agnostic Face Swapping' regardless of whether or not the training dataset of the deep network exist. In other words, the hassle of retraining the deep network after configuring the training dataset in order to replace a specific person's face can be avoided when using the present invention.

Figure 10:
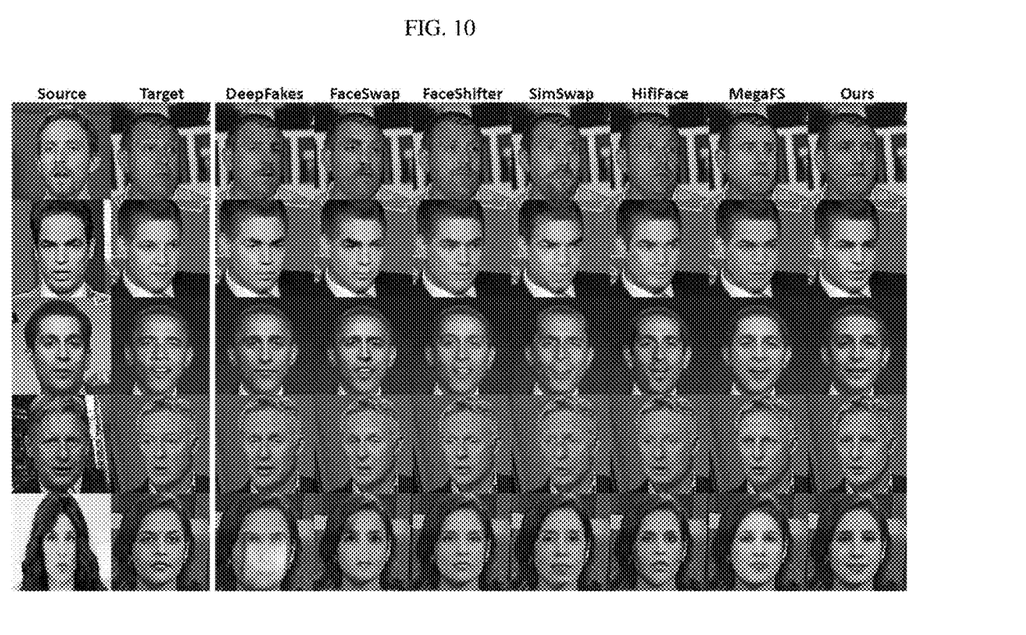
FIG. 10 is a result of comparing the present invention with the conventional technology where low-resolution image face swapping is performed.

FIG. 10 is a result of comparing the present invention with the conventional technology where low-resolution image face swapping is performed.

Referring to FIG. 10, it can be seen that the result (denoted as ours) of the present invention compared to the six prior art is much more natural, and the source image is well implemented in the target image after swapping.

Figure 11:
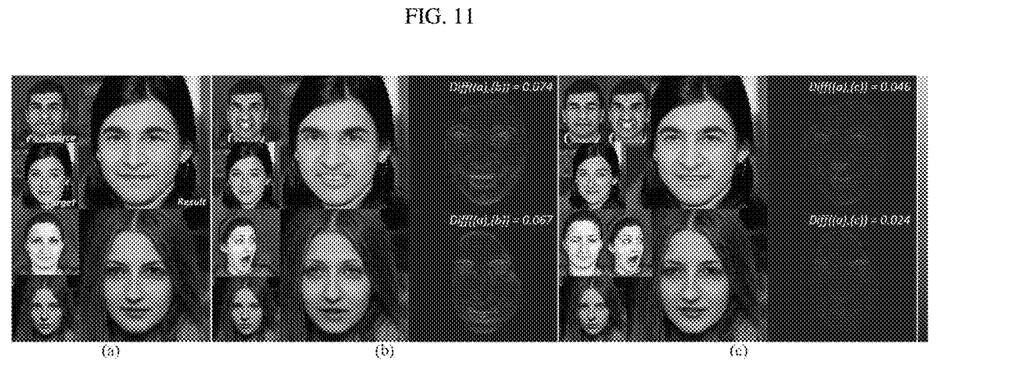
FIG. 11 is result of using low-quality multi-source images.

FIG. 11 is result of using low-quality multi-source images.

Referring to FIG. 11, (a) is the result when a high-quality source image (expressionless, frontal face) is used, (b) is the result when only a low-quality source image (unique expression, side face) is used, and (c): This is the result of complementary use of several low-quality source images ((b)+eyes closed) through the present invention.

Referring to FIG. 11, the present invention provides new method and system capable of utilizing several low-quality (unique facial expressions, angles, etc.) source images at once (see (c)), and, in particular, the information distributed in multiple sources is utilized in a complementary manner.

Therefore, considering that the range of facial expressions and postures that can be taken by an object in real life is very wide, it has a clear advantage over the prior art.

Figure 12:
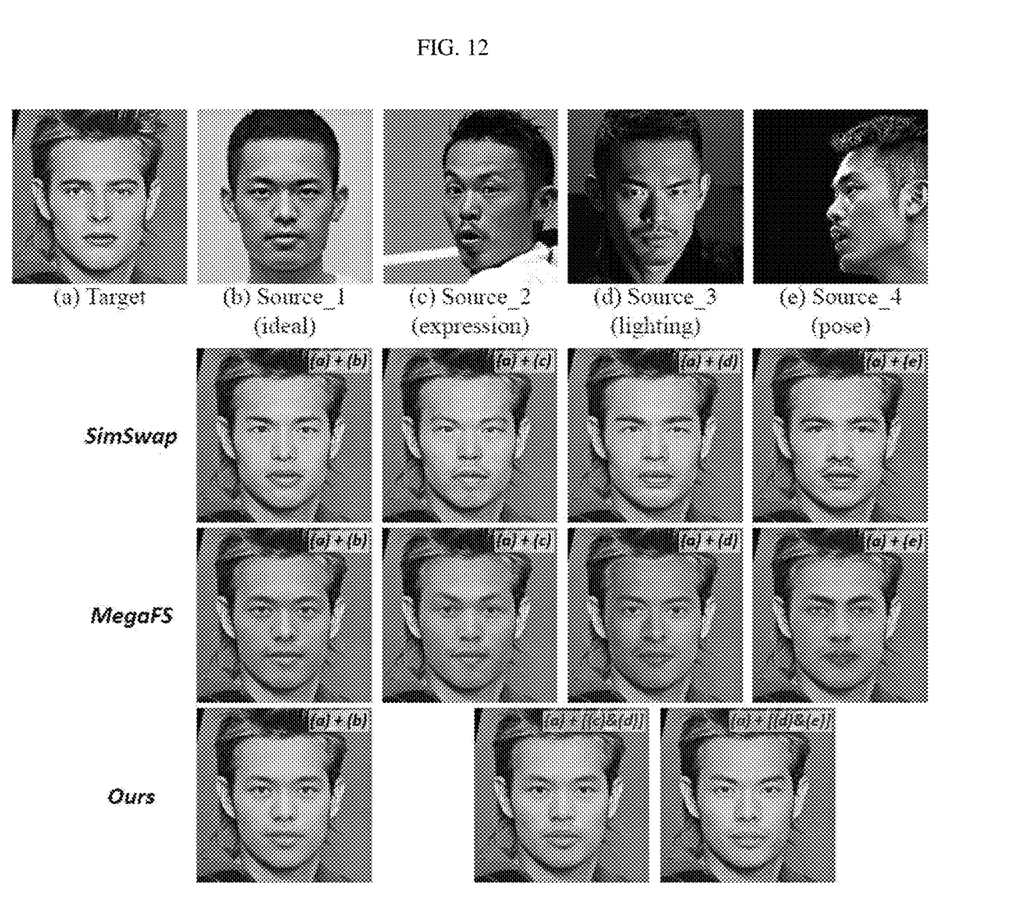
FIG. 12 is the result of qualitative analysis of multi-source face swapping results in VGGFace2-HQ.

FIG. 12 is the result of qualitative analysis of multi-source face swapping results in VGGFace2-HQ.

The first row in FIG. 12 shows one target image, one ideal source and three non-ideal images, where all sources are from the same ID in VFHQ.

The lower row of FIG. 12 shows one image generated from an ideal source, one generated image, and one image generated from a source with various attributes. In the case of the conventional SimSwap and MegaFS, it can be seen that the difference occurs at a perceptible level in the result value according to the change of the source attribute (in particular, (d) and (e)).

On the other hand, in the case of the multi-source face swapping according to the present invention using two images It can be seen that there is no significant difference in color and magnification compared with the case of using an ideal source.

As described above, most of the conventional method can only be performed on images with a maximum resolution of 512×512, and even in the case of some methods applicable to a resolution of 1024×1024, the quality of the result is still poor.

On the other hand, in the present invention, high-quality face swapping is possible even in 1024×1024 with a high resolution result. In this regards, the advantages of the present invention become clearer when considering the recent spread of high-definition video equipment. In addition, it is possible to produce the highest level of clarity and natural results compared to prior art, and it is possible to generate high quality results by simultaneously utilizing several low-quality (unique facial expressions, angles, etc.) source images (two or more).

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system for swapping face with high-definition comprising:
 a feature point extraction unit for extracting at least one feature points from a source image;
 an identity conversion unit generating an output for an attention algorithm from the at least one feature points from the feature point extraction unit; and
 an image generation unit for generating a swapping face image according to the output from the identity conversion unit,
 wherein the identity conversion unit generates the output for both a soft attention and a hard attention algorithm at the same time,
 wherein the soft attention algorithm generates an attention value according to the equation below:

$A_{soft} = S \cdot \mathrm{Norm}(F_t) + M$, where $A_{soft} \in R^{C \times HW}$ is the output of soft attention, V=h $(F_s)$, $M = V \otimes A^T$, $S = \sqrt{V^2 \otimes A^T - M^2}$, h(•) is a 1×1 convolution layer, $M \in R^{C \times HW}$ where each point in M can be interpreted as the sum of all points in V weighted by A.

2. The system for swapping face with high-definition of claim 1, wherein the hard attention algorithm generates attention an attention value according to the equation below:

$$h_i = \arg\max_j A_{(i,j)},$$
$$A_{hard\,(i,j)} = V_{(i,h_i)}$$

where $A_{hard}$ is the output of the hard attention algorithm, the value of hi is an index, which represents the most relevant position in the source image with respect to the i-th position in the target image, A(i, j) indicates the attention score of the j-th key for the i-th query, and $A_{hard}$ (i, j) is the element at the (i, j) position of $A_{hard}$.

3. The system for swapping face with high-definition of claim 1, wherein the identity conversion unit generates an attention map $A \in R^{HW \times HW}$ for the soft and hard attention algorithm according to the equation below:

$$A = \text{Softmax}(Q_u^T \otimes K_u),$$

where $Q_u \in R^{C \times HW}$ and $K_u \in R^{C \times HW}$ are unfolded representation of $Q \in R^{C \times H \times W}$ and $K \in R^{C \times H \times W}$, and $\otimes$ is matrix multiplication.

4. The system for swapping face with high-definition of claim 1, wherein the source image comprises at least two images.

5. The system for swapping face with high-definition of claim 1, further comprising a learning unit that performs learning using an Ideality preserving loss, Identity loss, Learned Perceptual Image Patch Similarity (LPIPS) loss, Self-reconstruction loss, and Regularization loss.

6. The system for swapping face with high-definition of claim 5, wherein the loss function ($L_{total}$) can be defined as below:

$$L_{total} = \lambda_1 L_{ip} + \lambda_2 L_{id} + \lambda_3 L_{LPIPS} + \lambda_4 L_{self} + \lambda_5 L_{reg},$$

where $L_{ip}$ is Ideality preserving loss, $L_{id}$ is Identity loss, $L_{LPIPS}$ is LPIPS (Learned Perceptual Image Patch Similarity) loss, $L_{self}$ is self-reconstruction loss, $L_{reg}$ is Regularization loss.

7. A method for swapping face with high-definition comprising:
mapping feature points of a source image to a feature space;
generating an output for an attention algorithm from the mapped feature points; and
performing face swapping from the output, wherein the output comprises the output for both a soft and a hard attention algorithm, wherein the output for the soft attention algorithm is generated as below:

$$A_{soft} = S \cdot \text{Norm}(F_t) + M,$$

where $A_{soft} \in R^{C \times HW}$ is the output of soft attention, $V = h(F_s)$, $M = V \otimes A^T$, $S = \sqrt{V^2 \otimes A^T - M^2}$, $h(\cdot)$ is a 1×1 convolution layer, $M \in R^{C \times HW}$ where each point in M can be interpreted as the sum of all points in V weighted by A.

8. The method for swapping face with high-definition of claim 7, wherein the output for the hard attention algorithm is generated as below, $$h_i = \arg\max_j A_{(i,j)},$$
$$A_{hard\,(i,j)} = V_{(i,h_i)},$$

where $A_{hard}$ is the output of the hard attention algorithm, the value of hi is an index, which represents the most relevant position in the source image with respect to the i-th position in the target image, A(i, j) indicates the attention score of the j-th key for the i-th query, and Ahard (i, j) is the element at the (i, j) position of Ahard.

9. The method for swapping face with high-definition of claim 7, wherein the source image comprises at least two images.

10. The method for swapping face with high-definition of claim 7, further comprising performing learning using an ideality preserving loss, identity loss, Learned Perceptual Image Patch Similarity (LPIPS) loss, self-reconstruction loss, and regularization loss.

11. The method for swapping face with high-definition of claim 10, wherein the loss function ($L_{total}$) can be defined as below:

$$L_{total} = \lambda_1 L_{ip} + \lambda_2 L_{id} + \lambda_3 L_{LPIPS} + \lambda_4 L_{self} + \lambda_5 L_{reg},$$

where $L_{ip}$ is Ideality preserving loss, $L_{id}$ is Identity loss, $L_{IPIPS}$ is LPIPS (Learned Perceptual Image Patch Similarity) loss, $L_{self}$ is self-reconstruction loss, $L_{reg}$ is Regularization loss.

* * * * *